United States Patent [19]

Caldarella et al.

[11] 4,281,292

[45] Jul. 28, 1981

[54] SAMPLING SYSTEM FOR DECODING BIPHASE-CODED DATA MESSAGES

[75] Inventors: Riccardo Caldarella; Riccardo Nobile, both of Milan, Italy

[73] Assignee: Societa Italiana Telecomunicazioni Siemens S.p.A., Milan, Italy

[21] Appl. No.: 61,480

[22] Filed: Jul. 27, 1979

[30] Foreign Application Priority Data

Jul. 28, 1978 [IT] Italy .............................. 26237 A/78

[51] Int. Cl.³ .............................................. H03K 9/00
[52] U.S. Cl. ...................................... 329/50; 329/104; 375/87
[58] Field of Search ................. 329/50, 104, 105, 107; 375/84, 87, 56, 57; 371/47

[56] References Cited

U.S. PATENT DOCUMENTS

| | | | |
|---|---|---|---|
| 2,939,914 | 6/1960 | Ingham | 375/87 |
| 3,859,631 | 1/1975 | Holmes | 329/126 |
| 3,892,916 | 7/1975 | Boulter | 375/84 |
| 3,982,195 | 9/1976 | Turner | 375/84 X |

Primary Examiner—Siegfried H. Grimm
Assistant Examiner—Edward P. Westin
Attorney, Agent, or Firm—Karl F. Ross

[57] ABSTRACT

A receiving station of a data-transmission system decodes an incoming pulse train in the shape of a differentially biphase-coded carrier wave whose cycles represent respective message bits; the wave undergoes a phase reversal at the beginning of every cycle in which the transmitted binary signal has the logical value "1" but does not change in phase when that value is "0." The received pulse train is differentiated to yield either one or two spikes during each cycle, one such spike invariably occurring in the middle of a cycle. Since only these periodically recurring spikes determine the instants at which the carrier wave must be sampled during decoding, a gate in the differentiator output is blocked during part of each cycle by a locally generated square wave which also controls the sampling. A phase detector, comprising several cascaded flip-flops, receives the unsuppressed spikes together with the local square wave and shifts the latter by half a cycle whenever the spikes clearing the gate recur irregularly because blocking takes place at the wrong time.

8 Claims, 6 Drawing Figures

SAMPLING SYSTEM FOR DECODING BIPHASE-CODED DATA MESSAGES

FIELD OF THE INVENTION

Our present invention relates to a system for decoding, at a receiving station, an incoming pulse train in the shape of a biphase-coded carrier wave whose cycles represent respective bits of a binary message transmitted in base band.

BACKGROUND OF THE INVENTION

A particular carrier wave of the differentially biphase-coded type is characterized in that its phase is reversed at the beginning of every cycle in which the transmitted signal has the logical value "1" whereas the phase remains unchanged when that logical value is "0." With a slightly different code, described in commonly owned U.S. patent application Ser. No. 970,147, now U.S. Pat. No. 4,232,387, filed Dec. 18, 1978 by Ezio Cottatellucci, such a 180° phase shift occurs only upon a change of the basic signal from "0" to "1" or vice versa.

The decoding of such a biphase-coded carrier wave can be performed, as disclosed in the above-identified Cottatellucci patent, by algebraically combining the squared or clipped wave with a replica thereof shifted by half a cycle to produce a ternary wave and sampling the latter midway in every other half-cycle of the original wave. The sampling operation can be timed with the aid of correlation pulses or spikes derived by differentiation from the incoming carrier wave, these spikes ocurring invariably in the middle of each cycle while also appearing at irregular intervals—depending upon the logical values of the message bits—at the beginning of a new cycle. The correct sampling times are determined from the recurring pattern of the spikes.

Two modes of distinguishing between the "right" and the "wrong" half-cycles for sampling purposes have been particularly disclosed in the Cottatellucci patent. According to the first mode, an error signal is generated when the squared carrier wave and its replica have the same magnitude at the instant of sampling. This technique is applicable only to the specific biphase code considered in that application and would have to be modified for a different code. The second mode, more universally applicable, involves the use of marker pulses, obtained from the correlation pulses through a phase shift by a fraction of a half-cycle, and the blocking of these marker pulses during alternate half-cycles under the control of a locally generated square wave of the same frequency as the carrier wave, the unblocked marker pulses giving rise to masking pulses of a half-cycle's duration which control a gate in an output branch of the sampling-pulse generator so as to blank all properly positioned sampling pulses; an improperly positioned sampling pulse, passed by the gate, again results in an error signal. With either mode, as a precaution against accidental phase shifts due to noise, the error signals are accumulated to switch the sampling times by one half-cycle only in the event of a predetermined error rate, i.e. upon surpassing a given threshold. The disclosure of that commonly owned application is hereby incorporated by reference into the present application.

Another way of decoding a biphase-coded carrier wave, especially one of the type first described hereinabove, utilizes a technique in which the clipped wave and its replica are phase shifted by a full cycle. In that instance the resulting composite wave is essentially a duplicate of the basic signal and may therefore be correctly sampled in either half of any cycle, except for the fact that distortion experienced by the wave during transmission may make sampling in one half-cycle less error-prone and therefore more desirable than in the other half-cycle.

OBJECTS OF THE INVENTION

The principal object of our present invention is to provide alternate means for the establishment of proper or preferred sampling times which, while generally applicable to a variety of differentially biphase-coded carrier waves, are somewhat simpler than the circuit arrangement utilized for implementing the second mode described in the above-identified earlier application.

Another object is to provide circuitry for this purpose which is less susceptible to phase jitter liable to result in spurious error signals.

SUMMARY OF THE INVENTION

In accordance with our present invention, circuitry for producing a sequence of timing pulses to control a decoder in a receiver for biphase-coded carrier waves comprises differentiation means connected to the decoder input for deriving a spike from an incoming carrier wave upon each phase reversal thereof, timing means controlled by the differentiation means for producing a local square wave of the same frequency as the carrier wave but in substantial quadrature therewith, gating means with inputs respectively connected to the differentiation means and the timing means for blocking the transmission of spikes during a fraction of each cycle equal to substantially half a cycle, and phase-detection means with input connections to the gating means and to the timing means for emitting an error pulse in response to a discontinuity in the succession of spikes passed by the gating means; an input of the timing means is connected to the phase-detecting means for reversing the phase of the local square wave in response to such an error pulse.

Pursuant to a more particular feature of our invention, the phase-detecting means comprises a plurality of cascaded flip-flops followed by a differentiation stage.

In a manner similar to that disclosed in the commonly owned Cottatellucci U.S. Pat. No. 4,232,387, the timing means may comprise a local oscillator working into a frequency divider which acts as pulse-forming means to generate the aforementioned square wave. In contradistinction to the arrangement shown in the copending application, however, the oscillator has a synchronizing input connected to the aforementioned gating means so as to be driven, in normal operation, only by the periodically recurring spikes rather than by marker pulses appearing at regular intervals as well as in intermediate time positions. Thus, the oscillator is phase-locked to the incoming carrier wave so that the locally generated square wave in the output of its frequency divider is subjected to the same phase jitter as the spikes derived from the incoming wave.

BRIEF DESCRIPTION OF THE DRAWING

The above and other features of our invention will now be described in detail with reference to the accompanying drawing in which.

SPECIFIC DESCRIPTION

Figure 1:
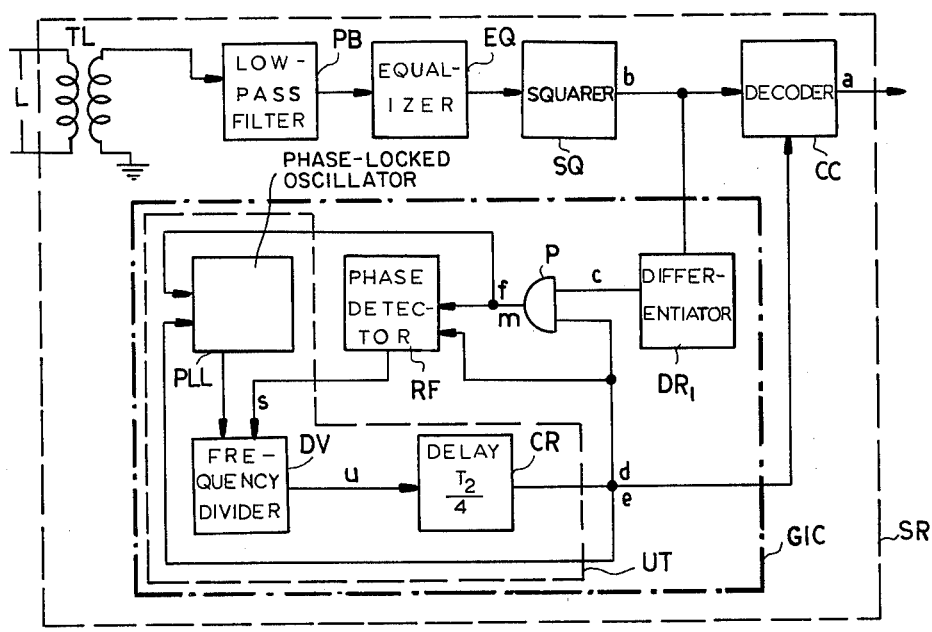
FIG. 1 is a block diagram of a receiver for biphase-coded carrier waves which includes sampling-controlling circuitry according to our invention.

The receiving station SR shown in FIG. 1 comprises a transformer TL with a primary winding connected across a transmission line L. A differentially biphase-coded carrier wave arriving over this line from a remote station is fed via a low-pass filter PB and an equalizer EQ to a squarer SQ which clips the incoming wave to convert it into a train b of rectangular pulses. The clipped carrier wave b is delivered to a decoder CC, designed to recover a binary base-band message a therefrom, and in parallel therewith to a differentiator $DR_1$ which derives a series of spikes c from a wave b and forms part of a sampling-pulse generator GIC. The latter further includes an AND gate P with an input connected to differentiator $DR_1$ and with output connections to a phase detector RF and, in parallel therewith, to a synchronizing input of a local oscillator PLL provided with a phase-locking loop; the oscillator, operating at n times the carrier-wave frequency (n being an integer preferably equal to a power of 2), works into a frequency divider DV of step-down ratio 1:n whose output circuit contains a delay line CR. Oscillator PLL, frequency divider DV and delay line CR together constitute a timing unit UT whose output is a square wave d or e fed on the one hand to a control input of decoder CC and on the other hand to the second input of AND gate P.

Figure 5:
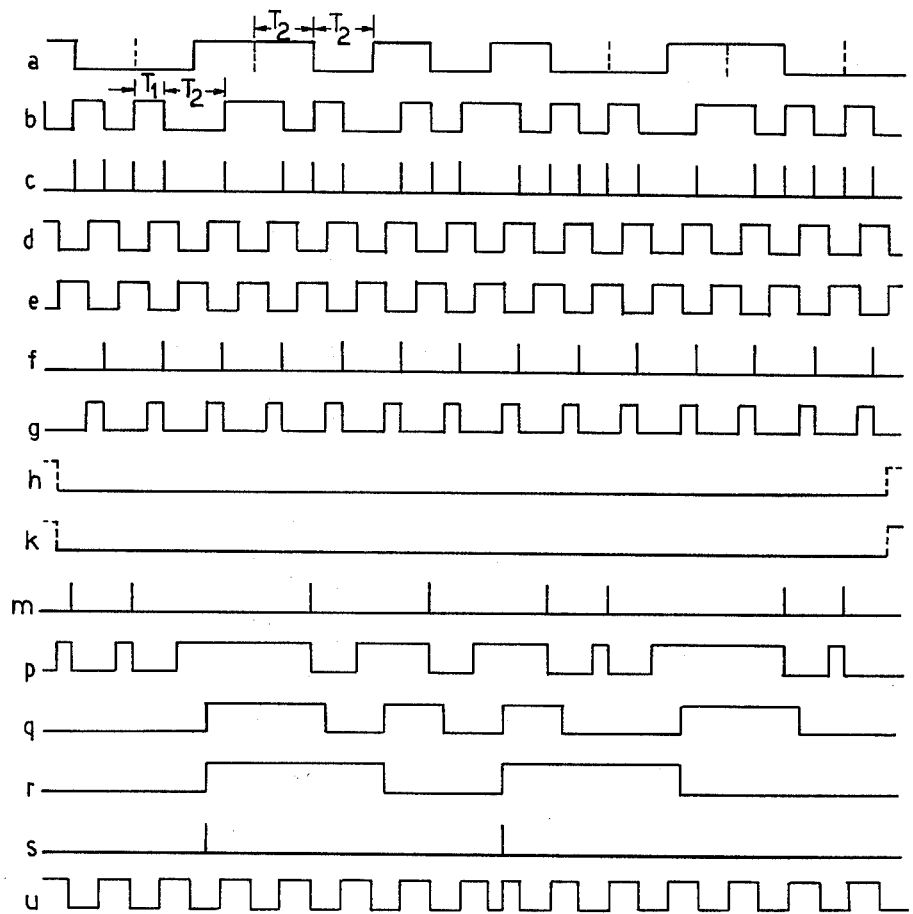
FIGS. 5 and 6 are two sets of graphs relating to the operation of the receiver embodying our invention.

Message signal a, carrier wave b, spikes c and square waves d, e have been illustrated in the first five graphs of FIG. 5. In that Figure we have indicated the pulse period $T_2$ of the message signal and the duration $T_1 = T_2/2$ of a half-cycle of wave b. From graph b it will be noted that the square wave reverses its phase at the beginning of any cycle in which signal a is high, i.e. has the logical value "1"; this phase reversal keeps the clipped wave b at the voltage level last attained, the two levels being here considered positive and negative though one of them could be zero. Thus, in effect, the length of a pulse of wave b immediately preceding a cycle constituting a bit "1" is doubled whereby a subharmonic of frequency $F_2 = \frac{1}{2}T_2$ is effectively superimposed upon the fundamental wave frequency $F_1 = \frac{1}{2}T_1 = 1/T_2$. This has been schematically illustrated in FIG. 3 which represents an eye diagram of the incoming wave as viewed on an oscilloscope connected to the receiver input upstream of squarer SQ. It will be noted that larger eyes $E_2$ of length $T_2$, representing the subharmonic $F_2$, encompass pairs of smaller eyes $E_1'$, $E_1''$ whose length more or less equals $T_1$, representing the fundamental $F_1$.

Figure 3:
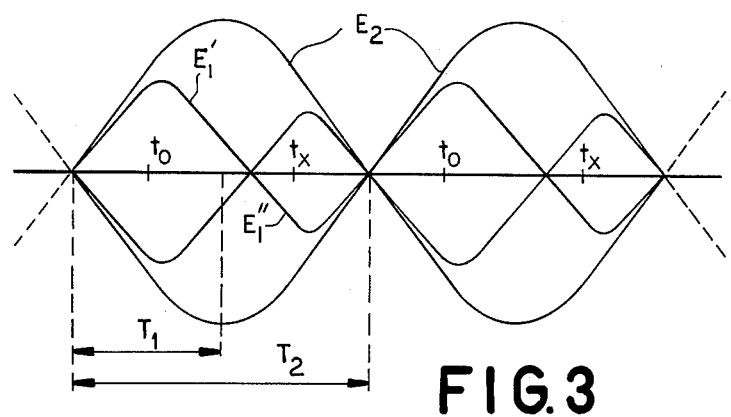
FIG. 3 shows an eye diagram of an incoming carrier wave to be decoded.

The eyes $E_1'$, $E_1''$ shown in FIG. 3 are often found to be of unequal lengths owing to distortion along line L, which tends to attenuate higher frequencies more than lower ones, such distortion being usually compensated only imperfectly by the equalizer EQ of opposite attenuation characteristic, especially when the latter is of the nonadaptive type. The relative eye size, therefore, may differ according to whether the wave is monitored upstream or downstream of the equalizer. If the decoder is so designed that correct samples could be obtained at the center of either half-cycle of frequency $F_1$, and if the eye of a particular half-cycle (e.g. the first one as in the illustrated example) is invariably larger than that of the other half-cycle on account of distortion phenomena, a system according to our invention can also be used for insuring that sampling always takes place in the half-cycle with the larger eye in order to reduce the error rate.

Figure 6:
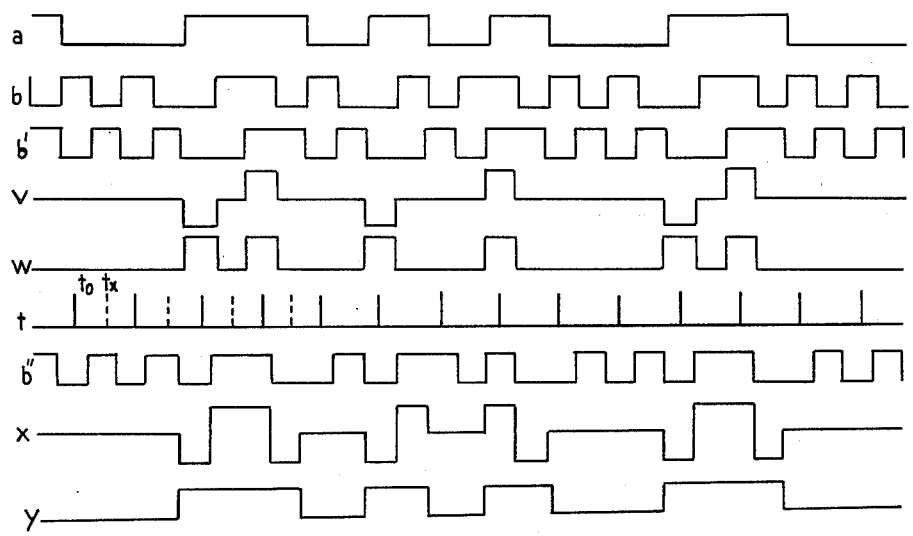

The two top graphs of FIG. 6, designated a and b, are identical with those of FIG. 5 and are followed by a graph b' showing the carrier wave b shifted by half a cycle in conformity with the teaching of U.S. Pat. No. 4,232,387. The direct superposition of these two waves results in a ternary wave v with negative, zero and positive voltage levels; polarity inversion of its negative pulses yields a wave w which at instants $t_0$, as indicated by solid timing pulses in graph t, has the same logical level as the corresponding bits of message signal a whereby the latter can be restored by conventional sample-and-hold means in decoder CC (FIG. 1). When sampling is carried out at instants $t_x$ (broken timing pulses), however, only zeroes are obtained.

The other decoding technique briefly discussed above is illustrated in the three bottom graphs of FIG. 6. Graph b'' shows the carrier wave b delayed by a full cycle and inverted; the superposition of wave b'' upon wave b results in a ternary wave, graph x, which after half-wave rectification (polarity inversion of its negative peaks), graph y, replicates the original signal a. Thus, wave y has the correct logical level at instants $t_0$ as well as $t_x$, yet sampling at the latter instants may increase the error rate because of the difference in eye width depicted in FIG. 3.

In the following description we shall assume that, for one reason or the other, the decoder CC of FIG. 1 is to sample the suitably pretreated carrier wave b at instants $t_0$, substantially midway of the first half of each cycle of length $T_2$, rather than at correspondingly positioned instants $t_x$ in the second half.

Graph f, FIG. 5, shows a succession of spikes corresponding to those of graph c that occur at the midpoint of each cycle, these spikes being therefore separated from one another by an invariable interval $T_2$. The spikes f coincide with the positive half-cycles of square wave d and are therefore passed by AND gate P whenever that square wave is applied to the other input thereof. On start-up, however, the phase is indeterminate so that the wave u (bottom graph of FIG. 5) issuing from divider DV, after being delayed by $T_2/4$ in line CR, may correspond either to wave d or to its complement e. In the latter case the gate P will pass the spikes of graph m, FIG. 5, in lieu of those of graph f to phase detector RF and to the synchronizing input of oscillator PLL to which the output wave of delay line CR is fed back via its phase-locking loop; that wave also goes to phase detector RF which, in the presence of wave e, emits an error signal s to divider DV.

Figure 2:
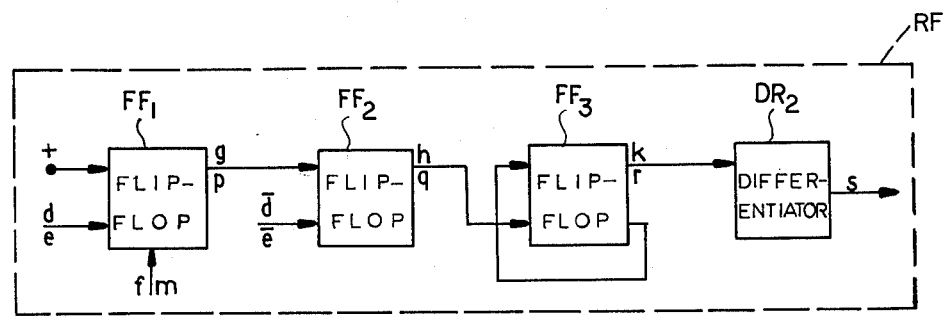
FIG. 2 is a more detailed diagram of a phase detector forming part of that circuitry.

Phase detector RF advantageously has the structure shown in FIG. 2, comprising a cascade of three data-type flip-flops $FF_1$, $FF_2$ and $FF_3$ followed by a differentiator $DR_2$. Flip-flop $FF_1$, whose data input is constantly energized by a positive voltage ($+$), receives on its switching input the wave d or e whose positive half-cycles set the flip-flop a quarter-cycle before the arrival of the next spike f or m, respectively, at its resetting input. If the delayed wave u has the configuration d, the set output of flip-flop $FF_1$ carries a succession of equispaced rectangular pulses as shown in graph g of FIG. 5. These pulses are fed to the data input of flip-flop $FF_2$ whose switching input receives the inverted and delayed wave u, thus wave d=e in the case now assumed; since the two inputs are not energized simultaneously, the set output of flip-flop $FF_2$ delivers a low voltage h to the switching input of flip-flop $FF_3$ whose data input is tied to its own reset output whereby this flip-flop acts as a frequency halver. The low signal h results in a similar signal k on the set output of flip-flop $FF_3$, as shown in the corresponding graphs of FIG. 5. Differentiator $DR_2$, therefore, does not emit any error pulse s under these circumstances.

If, however, the wave present at the switching input of flip-flop $FF_1$ has the configuration e, this flip-flop is reset only at irregular intervals by the associated spikes m so that pulses p of varying width will appear at its set output. The longer-lasting ones among these pulses will coincide with positive half-cycles of wave $e=d$ then fed to the switching input of flip-flop $FF_2$ whose set output will therefore carry a series of similarly broad pulses q converted into still broader pulses r by flip-flop $FF_3$. Differentiation of pulses r in stage $DR_2$ gives rise to error pulses s coinciding with their positive-going leading edges, that stage including a rectifier which suppresses the pulses generated at the negative-going trailing edges.

Figure 4:
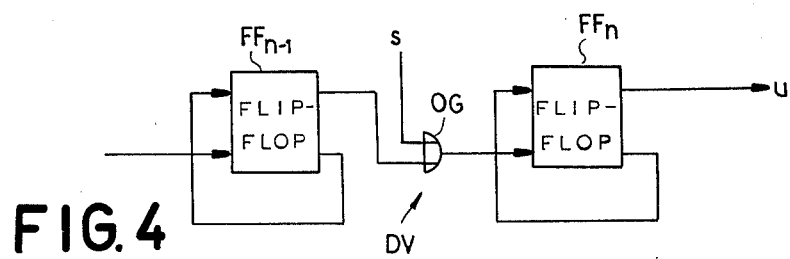
FIG. 4 is a diagram showing details of a frequency divider included in the circuitry of FIG. 1.

FIG. 4 shows the last two stages of the n-stage frequency divider DV, i.e. two flip-flops $FF_{n-1}$ and $FF_n$ each similar to flip-flop $FF_3$ of FIG. 2. The set output of flip-flop $FF_{n-1}$ is connected to the switching input of flip-flop $FF_n$ by way of an OR gate OG also receiving the error pulses s from phase detector RF. Such an error pulse, when generated, should arrive in the reset state of flip-flop $FF_n$ so as to set same out of turn; in the event of phase jitter, however, pulse s could ineffectually coincide with a switching pulse from divider stage $FF_{n-1}$ so that only a subsequent error pulse brings about the desired shift of wave u as illustrated in the middle of the bottom graph of FIG. 5.

Phase detector RF may further include an accumulator in the output of differentiator $DR_2$, similar to that described in U.S. Pat. No. 4,232,387 referred to above, so as to emit a pulse s only when the error rate surpasses a certain value determined by a voltage threshold. It should be noted, however, that in the case of preferential sampling at the wider eye (as discussed in connection with FIG. 3) a temporary shift to the other eye in response to a spurious error pulse will generally not lead to loss of information.

The solid timing pulses t shown in FIG. 6 are derived by differentiation from the positive-going leading edges of square wave d whereas the broken pulses are obtained in like manner from wave e. If for any reason sampling ought to be carried out at instants $t_x$ rather than $t_0$, as where eyes $E_1''$ are wider than eyes $E_1'$ (FIG. 3) or where the incoming wave is coded in the manner described in the Cottatellucci patent, the decoder CC can be easily modified for this purpose to differentiate the negative-going trailing edges of the local square wave instead.

We claim:

1. In a receiver for a biphase-coded carrier wave of predetermined frequency undergoing a phase reversal in the middle of each cycle thereof and also at the beginning of certain cycles according to the logical value of corresponding bits of a binary message conveyed thereby, in combination:

input means connected to a transmission line over which said carrier wave arrives from a remote station;

decoding means connected to said input means for sampling said carrier wave once per cycle to reconstruct said binary message; and circuitry for producing a sequence of timing pulses recurring at said predetermined frequency and controlling the sampling of said carrier wave in said decoding means, said circuitry comprising differentiation means connected to said input means for deriving a spike from said carrier wave upon each phase reversal thereof, timing means controlled by said differentiation means for producing a local square wave of said predetermined frequency in substantial quadrature with said carrier wave, gating means with inputs respectively connected to said differentiation means and to said timing means for blocking the transmission of said spikes during a fraction of each cycle equal to substantially half a cycle, and phase-detecting means with inputs connected to said gating means and to said timing means for emitting an error pulse in response to a discontinuity in the succession of spikes passed by said gating means, said timing means having a switching input connected to said phase-detecting means for reversing the phase of said square wave in response to said error pulse.

2. The combination defined in claim 1 wherein said timing means comprises a local oscillator with a synchronizing input connected to said gating means for phase control by said succession of spikes, frequency-dividing means driven by said oscillator, and delay means connected to said frequency-dividing means for shifting an output oscillation thereof by a quarter cycle of said predetermined frequency.

3. In a receiver for a biphase-coded carrier wave of predetermined frequency undergoing a phase reversal in the middle of each cycle thereof and also at the beginning of certain cycles according to the logical value of corresponding bits of a binary message conveyed thereby, in combination:

input means connected to a transmission line over which said carrier wave arrives from a remote station;

decoding means connected to said input means for sampling said carrier wave once per cycle to reconstruct said binary message; and circuitry for producing a sequence of timing pulses recurring at said predetermined frequency and controlling the sampling of said carrier wave in said decoding means, said circuitry comprising differentiation means connected to said input means for deriving a spike from said carrier wave upon each phase reversal thereof, timing means controlled by said differentiation means for producing a local square wave of said predetermined frequency in substantial quadrature with said carrier wave, gating means with inputs respectively connected to said differentiation means and to said timing means for blocking the transmission of said spikes during a fraction of each cycle equal to substantially half a cycle, and phase-detecting means with inputs connected to said gating means and to said timing means for emitting an error pulse in response to a discontinuity in the succession of spikes passed by said gating means, said timing means including a local oscillator with a synchronizing input connected to said gating means for phase control by said succession of spikes, said timing means further including pulse-forming means driven by said oscillator and provided with a switching input connected to said phase-detecting means for reversing the phase of said square wave in response to said error pulse.

4. The combination defined in claim 3 wherein said pulse-forming means comprises a multistage frequency divider having a final stage provided with a switching input.

5. The combination defined in claim 4 wherein said timing means further includes delay means connected to said frequency divider for shifting the square wave issuing therefrom by a quarter cycle of said predetermined frequency.

6. The combination defined in claim 1, 3, 4 or 5 wherein said phase-detecting means comprises a plurality of cascaded flip-flops followed by a differentiation stage.

7. The combination defined in claim 6 wherein said flip-flops include a first flip-flop with a data input connected to a source of fixed potential, a switching input connected to said timing means and a resetting input connected to said gating means, a second flip-flop with a data input connected to a set output of said first flip-flop and with a switching input invertingly connected to said timing means, and a third flip-flop with a data input connected to a reset output thereof, a switching input connected to a set output of said second flip-flop and a set output connected to said differentiation stage.

8. The combination defined in claim 1, 3, 4 or 5 wherein said input means includes an equalizer followed by a squarer.

* * * * *